Patented Aug. 19, 1941

2,253,297

UNITED STATES PATENT OFFICE 2,253,297

GELATINOUS SOLUTIONS OF CELLULOSE COMPOUNDS

Albert Aubrey Houghton, Saltcoats, and James Craik, Stevenston, Scotland, assignors to Imperial Chemical Industries Limited, a corporation of Great Britain No Drawing. Application October 3, 1938, Serial No. 233,116. In Great Britain October 5, 1937

16 Claims. (Cl. 260—2 .)

The present invention relates to the treatment of textile materials for example to finishing, combining and like operations, and in particular to the preparation of cellulose derivative compositions useful for such treatments.

It is often useful to treat fabrics with a cellulose derivative by a process which comprises applying a liquid cellulose derivative composition to the fabric and regenerating the cellulose derivative thereon. One satisfactory class of compositions for use in this process comprises a cellulose ester or ether of a low degree of substitution and insoluble in water which has been brought into the form of a syrupy solution in dilute aqueous caustic alkali and subsequently treated with a coagulating agent so as to produce gelatinous properties therein, without, however, causing complete gelation or any deposition of the cellulose derivatives. Such "gelatinous properties" are shown by the viscosity of the treated solution being substantially higher than that of an untreated solution of the same derivative diluted or made up with aqueous alkali of the original concentration so that the treated and untreated solutions have the same concentration of the cellulose derivative.

This invention has as an object to devise a new method of preparing such cellulose derivative compositions. A further object is to provide such cellulose derivative compositions. A still further object is to devise a method of producing such gelatinous properties in such cellulose derivative compositions. A still further object is to devise a new method of treating textiles. Further objects will appear hereinafter. These objects are accomplished by the following invention.

We have now found that a particularly advantageous method of obtaining compositions useful in the treatment of textile fabrics consists in treating the syrupy solution at a subnormal temperature with an aqueous coagulating agent in amount insufficient to bring about any substantial lack of fluidity, but sufficient at ordinary temperature to induce gelatinous properties, and then allowing the treated solution to return to ordinary temperature whereby the required gelatinous properties are made evident. By this method complete admixture of the coagulating agent is effected at relatively low viscosities so that homogeneity can be readily obtained without the risk of any undesired localised action, or inconveniences due to immediate gelation in the mixing vessel at the end of the mixing step.

The following examples illustrate, without in any way limiting the invention to the embodiments there described, the production of compositions suitable for the treatment of textile fabrics. Compositions produced according to these examples are free from syneresis even after the lapse of several months.

Example 1

A glycol cellulose, of the kind not completely soluble in aqueous caustic soda on simple admixture therewith, is brought into the form of a 9% solution in 10% caustic soda, by agitation of the glycol cellulose in the soda at a temperature of —5° C. and in the presence of a dispersing agent. When the solution is homogeneous, and still at the reduced temperature, an approximately 10% solution of sulphuric acid is gradually run in during continued agitation until the concentration of the cellulose derivative solution has been reduced to 7%. The temperature is maintained below 0° C. by refrigeration. The composition, which is still fluid, is then allowed to return to ordinary temperature, during which process it sets to a homogeneous jelly. As the paste or jelly has the useful property of "working" like a fluid on rollers, it may be applied to a fabric at ordinary temperature in the usual manner; and by a subsequent local or general chilling treatment part or all of the coating may be caused to become fluid and penetrate the fabric. The usual coagulation methods for fixing the cellulose derivative on the cloth are applicable.

Example 2

The procedure of Example 1 is followed, and the product is again cooled to —5° C. and is treated with sufficient 0.7% sulphuric acid, also at —5° C., to reduce the concentration of cellulose derivative in the final mixture to 3%. The mass is then allowed to return to room temperature, when it sets to a homogeneous jelly.

Example 3

The product of Example 1 is cooled to 0° C., and diluted with water at 0° C. until the concentration of cellulose derivative in the final mixture is 3%. The mass is then allowed to return to room temperature, when it sets to a homogeneous jelly.

The following examples show the application of the compositions of this invention to fabrics.

Example 4

12 parts of titanium dioxide are ball-milled for 18 hours with 100 parts by weight of a 7% solution of glycol cellulose in 7% caustic soda solution. The homogeneous mixture is then cooled to −5° C., and 133 parts of water cooled to 0° C. are mixed in. When the mixture is allowed to return to room temperature it forms a uniform jelly in which the pigment remains suspended. The mass is applied at ordinary temperature by means of a back-filling machine to a length of cotton pillow-cloth, which is then batched, coagulated with dilute sulphuric acid in a jig machine, washed, ironed and dried. The finished cloth contains 35% loading on the original fabric.

*Example 5*

A jelly prepared as in Example 4, but with the use of 7 parts by weight of carbon black instead of titanium oxide, is applied to an unfilled calico sheet by means of an engraved roller, and immediately passed through a coagulating solution. The printed cloth is suitable for the production of materials intended to show a printed pattern on one side only.

The coagulating agent for the treatment at sub-normal temperature can be any caustic alkali soluble compounds which, when sufficient of it is added at ordinary temperature, causes the cellulose derivative solution to gelate or coagulate. It may be a compound which acts by reducing the caustic alkali concentration absolutely or in comparison with the concentration of the cellulose derivative, or its action may be attributable to other causes. Thus the treatment at the sub-normal temperature may be effected simply by dilution with water, or there may be used an acid coagulant for example a dilute solution of a mineral acid such as sulphuric acid, or a weak acid such as carbon dioxide, phosphoric acid or acetic acid, or aqueous solutions of ammonium salts or acid salts. There may also be employed salts of non-metallic acids, especially those of the alkali and alkaline earth metals, for instance sodium, potassium or magnesium chloride and sulphate, or calcium chloride, sodium carbonate or sodium silicate. Highly water-soluble organic coagulants for instance alcohol and acetone may also be employed. It will be understood that more than one coagulating agent may be employed in association. The concentration is preferably below 25% when water alone is not used. The treatment with a coagulating agent at sub-normal temperatures, which treatment does not in fact bring about a coagulation under the conditions employed, is to be distinguished from the conventional treatment of the fabric after application of the cellulose derivative composition thereto, in which latter treatment the cellulose derivative is coagulated.

Instead of sulphuric acid, in Example 1 we could have used hydrochloric acid, acetic acid, phosphoric acid and their corresponding ammonium salts; or sodium bisulphate or bisulphite.

The low-substituted cellulose derivatives which may be employed in the present invention are cellulose derivatives having not more than one substituent group for every $C_6H_{10}O_5$ group, which are not soluble in water but are soluble in or are capable of being brought into solution in dilute aqueous sodium hydroxide solution. Thus we could use both those cellulose derivatives which can be dissolved by simple mixture with sodium hydroxide solution and those which like the glycol cellulose of Example 1 cannot be dissolved by simple admixture but can be brought into solution by special treatment such as agitation at −5° C. in the presence of a dispersing agent. Examples of suitable cellulose derivatives of the first class are: methyl cellulose, ethyl cellulose, glycol cellulose, and other hydroxyalkyl ethers of cellulose, cellulose sulphate, cellulose glycollic acid, cellulose xanthate, having over 0.5 and preferably about 1.0 substituent group per six-carbon unit of cellulose. Examples of suitable derivatives of the second class are as above, but having below 0.5 and preferably below about 0.25 substituent group per six-carbon unit of cellulose. The process of the invention can be applied to syrups having a concentration of cellulose derivative lying between 12% and 2% though we prefer to work with concentrations in the neighbourhood of 8%. For the purpose of bringing about the solution, the concentration of sodium hydroxide in water required is not independent of the desired concentration of the cellulose ether or ester, it being found that, the greater the concentration of the cellulose ester or ether solution required, the greater is the minimum concentration of the sodium hydroxide required to effect its solution by whatever method is employed. The concentration of sodium hydroxide required however cannot be indefinitely reduced by reducing the proportion of the cellulose ester or ether to the dissolving medium, for instance, to prepare a 7% solution by the freezing method there is required a concentration of about 7.5% sodium hydroxide, and to prepare a 2% to 5% solution there is required about 4.5% to 5.5% sodium hydroxide. From these compositions can be obtained for the treatment of fabrics and having any desired working consistency at a definite temperature and containing proportions of cellulose derivative lying between 8% and 2%. In applying the compositions to the textiles mechanical agitation for instance by means of rollers is desirable, and the compositions may be applied to fabrics by means of a doctor or other suitable spreading device at ordinary temperature. If the coated textile is chilled before coagulating the coating applied to it, the penetration can be increased.

We prefer in preparing the cellulose derivative composition to add the coagulating agent at a temperature of −5° C. but good results can be obtained at temperatures between −10° C. and +10° C.

This invention is a valuable advance in the art as it enables the cellulose derivative composition to be in the form of a homogeneous jelly which is stiffer than similar products having the same concentration obtained by other means, or if desired the jelly may, without detriment to its physical properties, contain a higher concentration of the cellulose derivative. Thus the compositions of the present invention may be applied to a fabric at a higher loading and with less penetration than the corresponding compositions and a reduction in the number of steps necessary in the production of a highly dressed fabric is thus rendered feasible.

Furthermore the compositions may be filled into suitable transport containers while at low temperature and while still in fluid form; and the semi-solid state of the composition at ordinary temperature renders it more suitable for manipulation and transport than the corresponding compositions obtained by other means. In addition, the semi-solid nature of the compositions renders them especially suitable as vehicles for inorganic pigments, fillers and the like, which are liable to settle from a liquid composition.

As many apparently widely different embodiments of this invention may be made without departing from the spirit and scope thereof, it is to be understood that the invention is not limited to the specific embodiments thereof except as defined in the appended claims.

We claim:

1. A method of manufacturing cellulose derivative compositions which comprises bringing into a syrupy solution in aqueous caustic alkali of 4.5 to 10% concentration a cellulose derivative having less than one substituent group per glucose unit, insoluble in water, soluble in said caustic alkali solution, and selected from the class consisting of cellulose esters and cellulose ethers, treating the solution at a temperature within the range —10° to +10° C. with a coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

2. A method of manufacturing cellulose derivative compositions which comprises bringing into a syrupy solution in aqueous caustic alkali of 4.5 to 10% concentration a cellulose ether having less than one substituent group per glucose unit, insoluble in water, and soluble in said caustic alkali solution, treating the solution at a temperature within the range —10° to +10° C. with a coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

3. A method of manufacturing cellulose derivative compositions which comprises bringing into a syrupy solution in aqueous caustic alkali of 4.5 to 10% concentration a cellulose hydroxyalkyl ether having less than one substituent group per glucose unit, insoluble in water, and soluble in said caustic alkali solution, treating the solution at a temperature within the range —10° to +10° C. with a coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

4. A method of manufacturing cellulose derivative compositions which comprises bringing into a syrupy solution in aqueous caustic alkali of 4.5 to 10% concentration a glycol cellulose having less than one substituent group per glucose unit, insoluble in water, and soluble in said caustic alkali solution, treating the solution at a temperature within the range —10° to +10° C. with a coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

5. A method of manufacturing cellulose derivative compositions which comprises bringing into a syrupy solution in aqueous caustic alkali of 4.5 to 10% concentration a methyl cellulose having less than one substituent group per glucose unit, insoluble in water, and soluble in said caustic alkali solution, treating the solution at a temperature within the range —10° to +10° C. with a coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

6. Process of claim 1 wherein the cellulose derivative is a cellulose ester.

7. Process of claim 1 wherein the cellulose derivative is a cellulose sulfate.

8. A method of manufacturing cellulose derivative compositions which comprises bringing into a syrupy solution in aqueous caustic alkali of 4.5 to 10% concentration a cellulose derivative having less than one substituent group per glucose unit, insoluble in water, soluble in said caustic alkali solution, and selected from the class consisting of cellulose esters and cellulose ethers, treating the solution at a temperature within the range —10° to +10° C. with an acid coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

9. A method of manufacturing cellulose derivative compositions which comprises bringing into a syrupy solution in aqueous caustic alkali of 4.5 to 10% concentration a cellulose ether having less than one substituent group per glucose unit, insoluble in water, and soluble in said caustic alkali solution, treating the solution at a temperature within the range —10° to +10° C. with an acid coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

10. A method of manufacturing cellulose derivative compositions which comprises bringing into a syrupy solution in aqueous caustic alkali of 4.5 to 10% concentration a cellulose hydroxyalkyl ether having less than one substituent group per glucose unit, insoluble in water, and soluble in said caustic alkali solution, treating the solution at a temperature within the range —10° to +10° C. with an acid coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

11. A method of manufacturing cellulose derivative compositions which comprises bringing into a syrupy solution in aqueous caustic alkali of 4.5 to 10% concentration a glycol cellulose having less than one substituent group per glucose unit, insoluble in water, and soluble in said caustic alkali solution, treating the solution at a temperature within the range —10° to +10° C. with an acid coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

12. A method of manufacturing cellulose derivative compositions which comprises bringing into a syrupy solution in aqueous caustic alkali of 4.5 to 10% concentration a methyl cellulose having less than one substituent group per glucose unit, insoluble in water, and soluble in said caustic alkali solution, treating the solution at a temperature within the range $-10°$ to $+10°$ C. with an acid coagulating agent therefor in amount insufficient to bring about any substantial lack of fluidity at the temperature employed but sufficient at normal temperature to induce gelatinous properties and then permitting the solution to return to normal temperature whereby gelatinous properties are induced.

13. Process of claim 8 wherein the cellulose derivative is a cellulose ester.

14. Process of claim 8 wherein the cellulose derivative is cellulose sulfate.

15. Process of claim 8 wherein the acid coagulant is sulfuric acid.

16. Process of claim 11 wherein the acid coagulant is sulfuric acid.

ALBERT AUBREY HOUGHTON.
JAMES CRAIK.